3,676,273
FILMS CONTAINING SUPERIMPOSED CURVED CONFIGURATIONS OF MAGNETICALLY ORIENTATED PIGMENT
Irving Stuart Graves, Media, Pa., assignor to E. I. du Pont de Nemours and Company, Wilmington, Del.
No Drawing. Filed July 30, 1970, Ser. No. 59,680
Int. Cl. B44c 3/02; C09d 5/28; C09j 5/00
U.S. Cl. 161—3                              9 Claims

ABSTRACT OF THE DISCLOSURE

A pigmented film comprising a film of film-forming material and contained in the film, magnetically orientable pigment that is orientated in superimposed curved configurations.

BACKGROUND OF THE INVENTION

This invention relates to films containing superimposed curved configurations of magnetically orientable pigment. Such films exhibit unique visual effects.

SUMMARY OF THE INVENTION

According to the present invention there is provided a pigmented film comprising:

(a) a film comprised of film-forming material and
(b) contained in the film 0.1% to 95% (by weight of the film) of magnetically orientable pigment that is orientated in superimposed curved configurations.

There is also provided by this invention a method of producing such films which comprises:

(a) providing a soft first film comprising film-forming material and containing 0.1% to 95% (by weight of the film-forming material) of magnetically orientable pigment,
(b) subjecting the soft first film to curved magnetic fields, thereby orientating the pigment in curved configurations,
(c) hardening the first film,
(d) overlaying the first film with a soft second film comprising film-forming material and containing 0.1% to 95% (by weight of the film-forming material) of magnetically orientable pigment,
(e) subjecting the soft second film to curved magnetic fields positioned in such a manner that the pigment will be orientated in curved configurations that are superimposed over the curved configurations in the first film.

DESCRIPTION OF THE INVENTION

The pigments

Suitable pigments are any particles of material that are magnetically orientable, i.e. when placed in a magnetic field will align themselves along the lines of force of the magnetic field. Often such pigments are metallic (the word metalic, for the purpose of this invention, is meant to include metallic oxides). Examples of such metallic pigments include iron, iron alloys, steel, steel alloys, nickel, cobalt, iron oxide, chromium dioxide, etc.

Metallic pigment can also be deposited on or dispersed in nonmagnetically orientable materials to produce a final pigment material that is subject to magnetic orientation. An example of this is nickel coated mica flake or particles.

Nonmagnetically orientable pigments such as aluminum, copper, bronze, silver, gold, etc. preferably in flake form, are also suitable when used in combination with a pigment that is magnetically orientable. In these mixed pigments the magnetically orientable pigment and the nonmagnetically orientable pigment should be in intimate contact, although it is not necessary that one type of pigment be coated on the other type. When using such mixed pigments, there should be sufficient magnetically orientable pigment present to render the mixture responsive to the action of a magnetic field. Generally, this means that the total pigment should contain at least 10% by weight of the magnetically orientable pigment and preferably 25% or more of the magnetically orientable pigment.

Preferred magnetically orientable pigment is nickel, preferably in the form of flakes, needles or plates. Especially preferred is the highly reflective nickel flake [1] produced by vauum depositing nickel over a release coated substrate, removing the deposited nickel, and then dividing the nickel to produce flakes of the desired size.

While visual effects can be produced with most any magnetically orientable pigment particles, the most desirable effects are produced when the pigment is in the form of flakes, plates or needles.

The concentration of magnetically orientable pigment in the film can vary over wide limits. In general, the magnetically orientable pigment can range from as little as 0.1% to as much as 95% of the weight of the film. The exact numerical upper limit of the magnetically orientable pigment depends on the visual effect desired and the film forming material used, and should not be so much that the resulting film has insufficient strength. Often the magnetically orientable pigment will be present in an amount of no more than about 80% and under many circumstances no more than about 50%; preferably it is present in an amount of from about 0.5% to about 25% (the foregoing percentages being by weight, based on the weight of the film).

The film-forming material

The film that contains the magnetically orientated pigment is comprised of any suitable film-forming material.

One type of film-forming material is inorganic such as glass, porcelain, borates, silicates, silica and the like.

Another type of film-forming material is casein, casein derivatives, or other film-forming materials derived from animal or plant protein or other animal or plant substances.

Another type of film-forming material is polymer either natural or synthetic (polymer for the purpose of this invention being meant to include homopolymers and copolymers). Examples of suitable polymer include varnishes, drying oils, allyl resins, epoxy resins, formaldehyde condensation resins (including phenolic, urea melamine and the like), polyurethanes, polyesters, deriavtives of cellulose including cellulose esters, cellulose ethers, nitrocellulose, etc.

Other examples of film-forming polymers include those produced by the addition polymerization of ethylenically unsaturated monomers such as acrylic acid, methacrylic acid, esters of acrylic acid or methacrylic acid formed from alcohols having about 1 through 20 carbon atoms (such as methyl acrylate or methacrylate, ethyl acrylate of methacrylate, propyl acrylate or methacrylate, isopropyl acrylate or methacrylate, the various butyl acrylates or methacrylates, 2-ethylhexyl acrylate or methacrylate, n-hexyl, n-octyl, t-octyl, hexadecyl, or octadecyl acrylates or methacrylates), itaconic acid, fumaric acid, esters of itaconic acid or fumaric acid with alkanols of 1–20 carbon atoms, acrylonitrile, methacrylonitrile, acrylamine, styrene, butadiene, vinyl chloride, vinyl toluene, maleic anhydride, alkyl acetate, t-butylaminoethyl methacrylate, hydroxyalkyl acrylates and methacrylates, ethylene, propyl-

---

[1] Such pigment can be produced according to the teaching of U.S. Pat. 2,889,378 (with the exception that the flake is made of nickel instead of aluminum) the disclosure of which is hereby incorporated by reference.

ene, dimethyl or diethyl aminoethyl methacrylate, tetrafluoroethylene, hexafluoropropylene, vinyl fluoride, vinylidene fluoride, or blends of the foregoing.

Preferred films include those comprised of polymers formed from the addition polymerization of ethylenically unsaturated monomers. Especially preferred films comprise polymers of acrylic acid, methacrylic acid, esters of acrylic acid or methacrylic acid with alkanols of about 1–20 carbon atoms, dimethyl or diethyl aminoethyl methacrylate or blends of the foregoing.

Blends of film-forming materials can also be used.

The film can contain adjuncts such as plasticizers, fillers, dispersing agents, normal pigment, dyes and the like.

The process

A film-forming composition is made up which contains the film-forming material and the magnetically orientable pigment, and if desired adjuncts. The composition can be in the form of a paint wherein the film-forming material is in solution in a suitable liquid media or a paint wherein the film-forming material is dispersed in a suitable liquid media. Or the composition can comprise a film-forming material in melted or soft form that has the magnetically orientable pigment dispersed therein.

The composition is then coated on a suitable substrate, and while it is still soft enough that the magnetically orientable pigment can be moved, it is subjected to curved magnetic fields. These magnetic fields orientate the magnetically orientable pigment along the lines of force of the magnetic field. While such pigment is in an orientated position, the composition is allowed to harden. The result is a hard film adhered to the substrate that contains the above-mentioned pigment orientated along the lines of force of the applied magnetic field.

The above first film is then overlaid with a soft second film of polymer containing magnetically orientable pigment. While the film is still soft enough that the magnetically orientable pigment can be moved, it is subjected to curved magnetic fields positioned in such a manner that the pigment becomes orientated in curved configurations that are superimposed over the curved configurations in the first film.

After the second film is allowed to harden, the result is a hard unitary film adhered to the substrate that contains pigment orientated in superimposed curved configurations. If a free film is desired, it can be made by any suitable technique such as casting, molding, extruding, coating on a substrate from which the film can be removed and the like.

Superimposed means that the pigment in curved configurations in the second film is layed over the pigment in curved configurations in the first film. Such overlaid configurations can coincide or can overlap in only some areas. Such superimposed configurations exhibit unique visual effects, i.e. double image effects, extreme illusion of depth, configurations that appear to move when the film is moved, etc. Preferably, to obtain optimum visual effects when the overlaid configurations coincide, the films should be of different colors.

Of course, if desired, in accordance with this invention, one can make a unitary film that has superimposed curved configurations obtained by laying up more than two films.

The curved magnetic fields can be obtained by any suitable method. A single magnet can be used, or a plurality of magnets can be used that are arranged preferably so that opposite poles are adjacent to each other. As well as this, magnetizable metal of various shapes can be placed over the pole of a magnet or the poles of a plurality of magnets to produce curved lines of force in various patterns. For example, a piece of sheet steel cut in a star shape can be placed over a magnet or plurality of magnets. Or the surface of a steel sheet can be cut, machined, etched, etc. into ridges, valleys, grooves or other relief configurations and then this sheet can be placed in contact with a magnet or plurality of magnets, and the relief surface directed towards the film. Of course, if desired, an electromagnet or electromagnets can be used instead of or in conjunction with permanent magnets.

The curved magnetic fields can originate at any suitable location, so long as a curved field of the desired configuration passes through the film. For example, the field can originate below the film, above the film, to the side of the film or in a combination of the foregoing. Preferably, the field is located below the film.

The film can be adhered to any suitable substrate such as paper, cardboard, regenerated cellulose, cloth, earthenware, wood fabric, metal (ferrous and nonferrous such as steel, iron, aluminum, brass, bronze, etc.) plastic, leather, synthetic leather, polymer and the like.

Or if desired, the film itself can be used as decorative wrap, tile, coverings, panels, etc.

The invention will be understood more clearly by reference to the following examples. All parts and percentages are by weight unless otherwise specified.

Example 1

An acrylic lacquer was made using standard techniques and having 35% solids in solution in a solvent mixture of ketones, esters and aromatics. The following was the composition of the solids in the acrylic lacquer:

| Ingredient— | Parts |
|---|---|
| Polymethyl methacrylate | 18.4 |
| Copolymer of 99% methyl methacrylate and 1% 2-dimethylaminoethyl methacrylate | 10.0 |
| Copolymer of 18% butyl acrylate and 82% methyl methacrylate | 28.4 |
| 35% coconut oil alkyd | 21.0 |
| Cellulose acetate butyrate | 19.9 |
| Ultraviolet screen | 2.0 |
| Polybutyl acrylate | 0.3 |
| | 100.0 |

A paint containing magnetically orientable pigment was then made using standard techniques that had the following composition:

| Ingredient— | Parts (grams) |
|---|---|
| Acrylic lacquer (35% solids) | 200 |
| Highly reflective nickel pigment produced by vacuum deposition [1] of nickel and having a size of about 200 mesh | 0.75 |
| Mill base of phthalo green pigment in acrylic lacquer | [2] Trace |

[1] Such pigment can be produced according to the teaching of U.S. Pat. 2,839,378 (with the exception that the flake is made of nickel instead of aluminum). A suitable method, for example, of producing such pigment includes depositing nickel over release coated Mylar® polyester film, scrubbing the deposited nickel in the presence of acetone to remove it, and agitating the nickel to reduce it to the desired size.
[2] Sufficient to give paint a pale green color.

The above paint was then sprayed over an aluminum panel that had been previously painted white. Located about ¼ inch below the aluminum panel were two bar magnets about ¼ inch apart. The poles of the two magnets were arranged so that opposite poles (north and south) were adjacent to each other and pointed toward the nonsprayed surface of the aluminum panel.

After drying the paint, the panel was shifted ¼ inch upward and ⅛ inch to the left. The panel was then sprayed with another coat of paint, identical to the one described above but with the exception that the mill base of phthalo green pigment was replaced with a sufficient amount of mill base of Auric® brown pulp pigment F–4–P (available from E. I. du Pont de Nemours and Company) to give the paint a pale gold color.

After the second coat of paint had dried, when viewed, the panel exhibited unique visual effects. There appeared to be a double image pattern, i.e. one curved configuration (a hump) of green-gold color and having laid over it slightly to one side, another curved configuration (a hump) of a paler green-gold. There was an impression that the two patterns were at different depths within a paint film having a greater than actual thickness.

Example 2

Example 1 was repeated with the exception that the highly reflective nickel pigment produced by vacuum deposition of nickel of about 200 mesh size was replaced with nickel flake pigment of about 325 mesh size available from Alcan Metal Powder Company and designated "MD-750."

The same two coat spray was used as in Example 1 but the magnets were not shifted. Thus, the curved configurations (humps) were positioned so that one was laid over the other and so that they coincided.

The result was a gold curved configuration having an extreme illusion of depth against a green background.

The invention claimed is:

1. A pigmented film comprising: (a) a film comprised of film-forming material and (b) contained in the film 0.1% to 95% (by weight of the film) of magnetically orientable pigment that is orientated in superimposed curved configurations produced by (1) providing a soft first film comprising film-forming material and containing orientable pigment, (2) subjecting the soft first film to curved magnetic fields, thereby orientating the pigment in curved configurations, (3) hardening the first film, (4) overlaying the first film with a soft second film comprising film-forming material and containing 0.1% to 95% (by weight of the film) of magnetically orientable pigment, (5) subjecting the soft second film to curved magnetic fields positioned in such a manner that the pigment will be orientated in curved configurations that are superimposed over the curved configurations in the first film, and (6) hardening the second film.

2. The film of claim 1 wherein the pigment is metallic.

3. The film of claim 2 wherein the pigment is in the form of flakes, plates or needles.

4. The film of claim 3 wherein the pigment is highly reflective nickel produced by vacuum deposition.

5. The film of claim 1 wherein the film-forming material is polymer.

6. The film of claim 5 wherein the polymer is formed from the addition polymerization of ethylenically unsaturated monomers.

7. The film of claim 6 wherein the polymer is formed from the addition polymermization of ethylenically unsaturated monomers selected from the group consisting of acrylic acid, methacrylic acid, esters of acrylic acid or methacrylic acid with alkanols of 1-20 carbon atoms, or dimethyl or diethyl aminoethyl methacrylate.

8. The film of claim 1 wherein the film-forming material is glass.

9. A method of producing the film of claim 1 which comprises:
(a) providing a soft first film comprising film-forming material and containing 0.1% to 95% (by weight of the film-forming material) of magnetically orientable pigment,
(b) subjecting the soft first film to curved magnetic fields, thereby orientating the pigment in curved configurations,
(c) hardening the first film,
(d) overlaying the first film with a soft second film comprising film-forming material and containing 0.1% to 95% (by weight of the film-forming material) of magnetically orientable pigment,
(e) subjecting the soft second film to curved magnetic fields positioned in such a manner that the pigment will be orientated in curved configurations that are superimposed over the curved configurations in the first film.

References Cited

UNITED STATES PATENTS

| 2,570,856 | 10/1951 | Pratt et al. | 161—162 |
| 3,413,141 | 11/1968 | Friedman | 117—238 |
| 3,117,065 | 1/1964 | Wootten | 117—238 |
| 3,549,405 | 12/1970 | Schrenk et al. | 117—33 |
| 2,418,479 | 4/1947 | Pratt et al. | 117—31 |
| 2,584,441 | 2/1952 | Fredendall | 264—108 |
| 2,809,731 | 10/1957 | Rau | 117—238 |
| 3,024,392 | 3/1962 | Baermann | 264—108 |
| 3,066,355 | 12/1962 | Schloemann et al. | 264—108 |
| 3,073,732 | 1/1963 | Hunsdiecker | 264—108 |

FOREIGN PATENTS 1,131,038   10/1968   Great Britain.

JOHN T. GOOLKASIAN, Primary Examiner

G. W. MOXON II, Assistant Examiner

U.S. Cl. X.R.

117—31, 33, 238; 156—306; 161—162, 163, 168, 413; 264—108